United States Patent
Deiparine (10) Patent No.: US 10,635,852 B2
(45) Date of Patent: Apr. 28, 2020

(54) IMAGE PROCESSING APPARATUS AND METHOD FOR CONTROLLING IMAGE PROCESSING APPARATUS

(71) Applicant: KYOCERA Document Solutions Inc., Osaka (JP)

(72) Inventor: Anthony Deiparine, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/503,132

(22) Filed: Jul. 3, 2019

(65) Prior Publication Data

US 2020/0057796 A1 Feb. 20, 2020

(30) Foreign Application Priority Data

Aug. 16, 2018 (JP) .................... 2018-153263

(51) Int. Cl.
*G06F 40/109* (2020.01)
*G06F 3/12* (2006.01)

(52) U.S. Cl.
CPC .......... *G06F 40/109* (2020.01); *G06F 3/1208* (2013.01); *H04N 2201/0094* (2013.01)

(58) Field of Classification Search
CPC .................................. G06F 40/109
USPC ........................................ 358/1.11
See application file for complete search history.

(56) References Cited

U.S. PATENT DOCUMENTS

| | | | |
|---|---|---|---|
| 7,031,910 B2* | 4/2006 | Eisele .................. | G06F 40/216 704/10 |
| 2004/0061886 A1* | 4/2004 | Sato ...................... | G06F 3/1232 358/1.13 |
| 2015/0015903 A1* | 1/2015 | Kanazawa ......... | G06K 15/1802 358/1.11 |

FOREIGN PATENT DOCUMENTS

JP 2015-16617 A 1/2015

* cited by examiner

*Primary Examiner* — Jacky X Zheng
(74) *Attorney, Agent, or Firm* — Stein IP, LLC (57) ABSTRACT

The image processing apparatus includes an accepting unit, first and second storage units, and a controller. The first storage unit stores frequency order data for each language. The controller, using character image data in a font cache area, performs rasterization processing on PDL data. The controller sets first and second cache areas. The controller, based on frequency order data corresponding to a selected language, generates character image data in descending order of character use frequency. The controller has the character image data generated based on frequency order data stored in the first cache area.

10 Claims, 7 Drawing Sheets

| LANGUAGE | ORDER OF USE FREQUENCY | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 ··· |
| English | e | t | a | o | i | n | s | r | h | l | c | d | u | m ··· |
| Japanese (Kanji) | 日 | 一 | 十 | 二 | 人 | 大 | 年 | 会 | 国 | 三 | 本 | 長 | 中 | 五 ··· |
| German | e | n | i | s | r | a | t | d | h | u | l | c | g | m ··· |
| Russian | o | e | a | и | н | т | с | в | л | р | к | д | м | п ··· |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

IMAGE PROCESSING APPARATUS AND METHOD FOR CONTROLLING IMAGE PROCESSING APPARATUS

INCORPORATION BY REFERENCE

This application is based upon and claims the benefit of priority from the corresponding Japanese Patent Application No. 2018-153263 filed on Aug. 16, 2018, the entire contents of which are incorporated herein by reference.

BACKGROUND

The present disclosure relates to an image processing apparatus which performs rasterization processing based on data written in a page description language (PDL). The present disclosure also relates to a method for controlling the image processing apparatus.

There are printing apparatuses which print based on data received from a computer. A computer transmits data in which printing content is written in a page description language. A printing apparatus which has received data generates print image data according to a described definition (command). Print image data is, for example, a bitmap data. When generating print image data, some printing apparatuses image characters. In this case, a printing apparatus generates character image data for each character. The printing apparatus pastes generated character image data to a page to generate print image data. Here, some printing apparatuses store the generated image data of each character in a cache memory. Reusing the data stored in the cache memory helps reduce the number of times of generating character image data.

As described below, there is a known technique by which character image data is stored in a cache memory. Some image forming apparatuses have a font cache of an LRU (least recently used) type, and, depending on whether the frequency of use of a character image is equal to or higher than a threshold value, judges whether or not to cache a character image at the top position in the font cache.

When rasterization (drawing) processing is performed based on data written in a page description language, texts (characters, words) may be imaged. Commands requesting imaging and texts to be imaged are embedded in data. Based on the commands and the texts, imaging of characters is performed character by character from the top of a page.

When a character is imaged, based on font data, character image data is generated. The generated character image data is pasted to a proper position in a page. The character is thus imaged. For example, image data of the character A is generated, and the generated image data of the character A is pasted. Generated character image data may be stored in a cache area. For example, a part of a RAM is allocated to the cache area. When the character image data to be imaged is in the cache area (when it hits), it is possible to reuse the character image data. When the character image data to be imaged is not in the cache area (when a cache failure occurs), character image data is newly generated.

SUMMARY

According to one aspect of the present disclosure, an image processing apparatus includes an accepting unit, first and second storage units, and a controller. The accepting unit accepts selection of a used language. The first storage unit stores font data. The first storage unit stores frequency order data in which, for each language, characters are defined in descending order of use frequency. The second storage unit includes a font cache area. The second storage unit stores character image data in the font cache area. The controller, using the character image data stored in the font cache area, based on PDL data written in a page description language, performs rasterization processing in which characters are imaged one by one to generate raster data. The controller sets first and second cache areas in the second storage unit as the font cache area. The controller, based on the frequency order data corresponding to the selected language, generates the character image data in descending order of use frequency. The controller has the character image data generated based on the frequency order data in the first cache area. When a cache failure occurs in which the character image data of a character to be imaged is not cached in the font cache area, the controller newly generates the character image data of the character which is not cached based on the font data. The controller has the newly generated character image data stored in the second cache area.

According to another aspect of the present disclosure, a method for controlling an image processing apparatus includes: accepting selection of used language; storing in a first storage unit font data and frequency order data in which, for each language, characters are defined in descending order of use frequency; having a font cache area for storing character image data stored in a second storage unit; performing, using the character image data stored in the font cache area, based on PDL data written in a page description language, rasterization processing in which characters are imaged one by one to generate raster data; setting first and second cache areas in the second storage unit as the font cache area; generating the character image data in descending order of character use frequency based on frequency order data corresponding to the selected language; storing the character image data generated based on the frequency order data in the first cache area; newly generating the character image data of the character which is not cached based on the font data when a cache failure occurs in which the character image data to be imaged is not cached in the font cache area; and storing the newly generated character image data in the second cache area.

This and other characteristics of the present disclosure, and the specific benefits obtained according to the present disclosure, will become apparent from the description of embodiments which follows.

DETAILED DESCRIPTION

The present disclosure is aimed at accelerating rasterization processing regardless of the language used. It thus helps reduce the time required for the processing. Hereinafter, with reference to FIGS. 1 to 9, an embodiment of the present disclosure will be described. A multifunction peripheral 100 will be taken as an example of an image forming apparatus. The image processing apparatus is not limited to the multifunction peripheral 100. The image processing apparatus may be of any other type, such as a printer. All the features described in connection with the embodiment in terms of structures, arrangements, and the like are merely examples and are not meant to limit the scope of the disclosure.

<Multifunction Peripheral 100>

Figure 1:
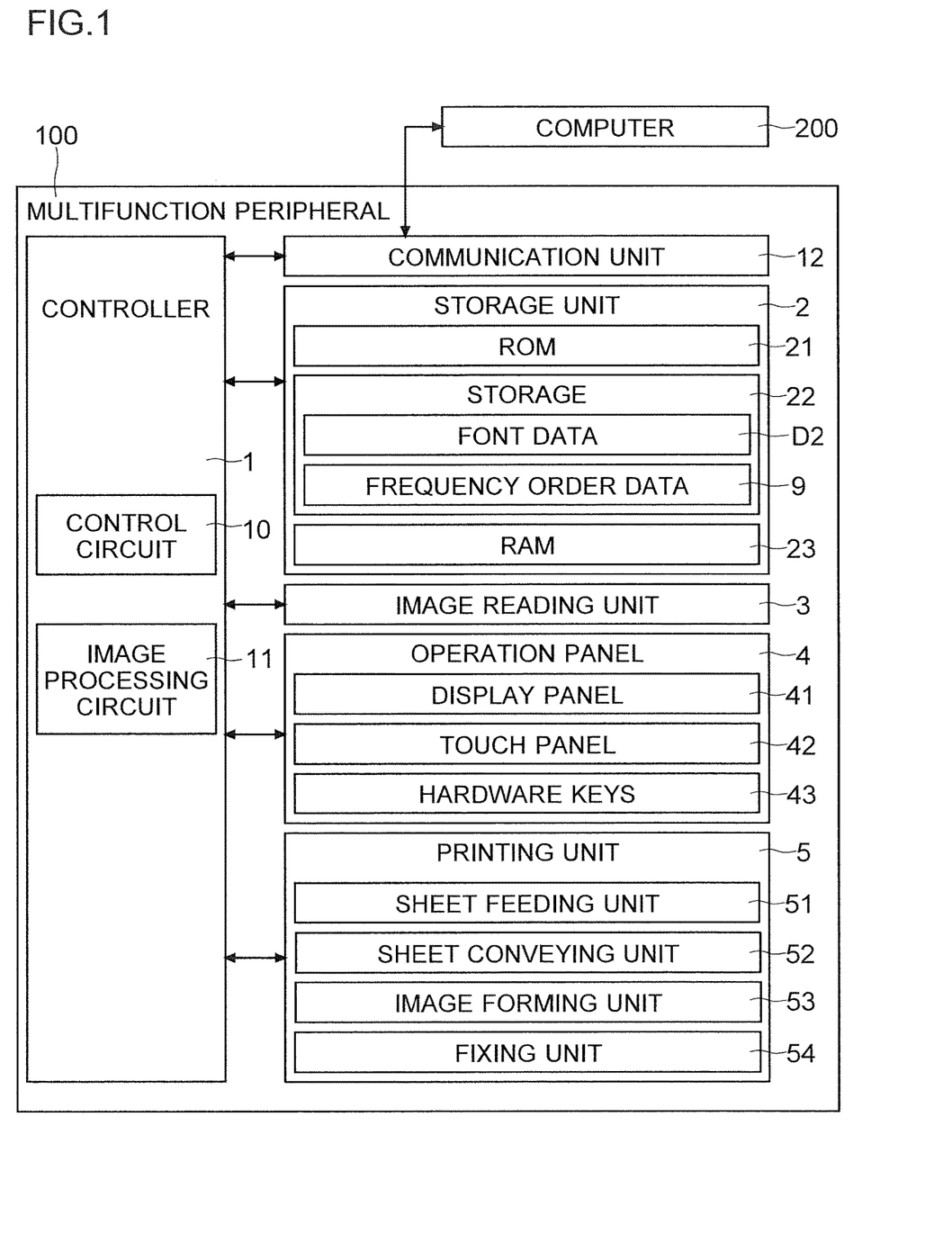
FIG. 1 is a diagram showing one example of a multifunction peripheral according to an embodiment.

With reference to FIG. 1, one example of a multifunction peripheral 100 according to the embodiment will be described. The multifunction peripheral 100 includes a controller 1, a storage unit 2, an image reading portion 3, an operation panel 4 (corresponding to an accepting unit), a printing unit 5, and a communication unit 12. The controller 1 controls the operation of the multifunction peripheral 100. The controller 1 includes a control circuit 10 and an image processing circuit 11. The control circuit 10 is, for example, a CPU. The control circuit 10 controls, based on programs and data stored in the storage unit 2, different parts (the image reading portion 3, the operation panel 4, the printing unit 5, and the communication unit 12). The image processing circuit 11 performs various kinds of image processing. The image processing circuit 11 is, for example, a circuit dedicated to image processing (an ASIC). The image processing circuit 11, for example, analyzes data written in a page description language and generates raster data (bitmap data, image data).

The storage unit 2 includes a ROM 21 (corresponding to a first storage unit), a storage 22 (corresponding to the first storage unit), and a RAM 23 (corresponding to a second storage unit). The ROM 21 is, for example, a flash ROM. The storage 22 is a large non-volatile storage device 202 such as an HDD or an SSD. The storage unit 2 stores various kinds of data and control programs. For example, the storage unit 2 stores control data, setting data, and image data.

During document reading, the controller 1 makes the image reading portion 3 read a document. The image reading portion 3 generates document image data. For document reading, the image reading portion 3 includes a light source (lamp), a lens, and an image sensor (line sensor).

The operation panel 4 includes a display panel 41, a touch panel 42, and hardware keys 43. The display panel 41 displays a screen and an image. The controller 1 controls display on the display panel 41. The controller 1 displays operation images used for setting of a job on the display panel 41. The operation images include, for example, buttons, keys, and tabs. The touch panel 42 accepts user operation. The touch panel 42 is provided on the top face of the display panel 41. The touch panel 42 recognizes the touched position. Based on the output from the touch panel 42, the controller 1 recognizes the operated operation image. Based on the operated operation image, the controller 1 recognizes user operation. Hardware keys 43 also accept user operation.

The printing unit 5 includes a sheet feeding unit 51, a sheet conveying unit 52, an image forming unit 53, and a fixing unit 54. The sheet feeding unit 51 includes a sheet cassette and a sheet feeding roller. A sheet is set in the sheet feeding unit 51. During a printing job, the controller 1 makes the sheet feeding unit 51 feed a sheet. The controller 1 makes the sheet conveying unit 52 convey the sheet. The sheet conveying unit 52 includes a conveying roller pair for conveying a sheet. The controller 1 makes the image forming unit 53 form a toner image based on raster data. The image forming unit 53 includes, for example, a photosensitive drum, a charging device, a developing device, and a transfer roller. The controller 1 makes the image forming unit 53 transfer the toner image to the conveyed sheet. The controller 1 makes the fixing unit 54 fix the toner image transferred to the sheet. The fixing unit 54 includes, for example, a heater and a fixing rotating member. The controller 1 makes the sheet conveying unit 52 discharge the sheet having undergone fixing toward the outside of the apparatus.

The communication unit 12 communicates with a computer 200. The communication unit 12 includes a connector, a communication circuit, and a communication memory. The communication memory stores communication software. The communication unit 12 receives printing data D1 from the computer 200. Based on received printing data D1, the controller 1 makes the printing unit 5 perform printing (a printing job).

<Computer 200 and Printing Data D1>

Figure 2:
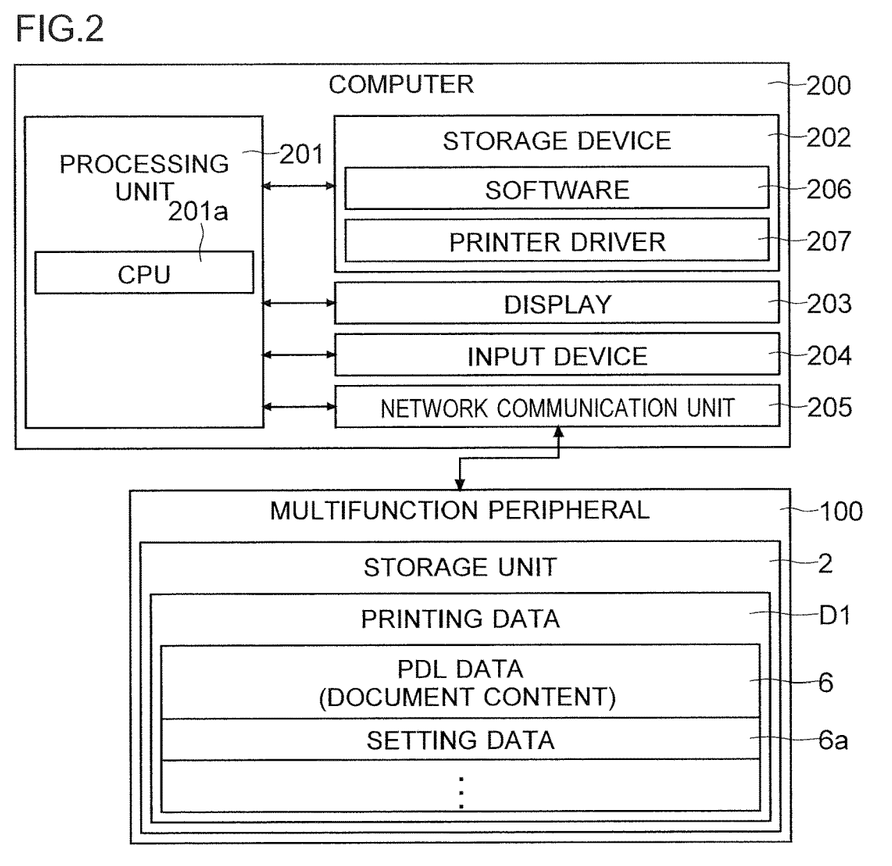
FIG. 2 is a diagram showing one example of a computer according to the embodiment.

Next, with reference to FIG. 2, one example of the computer 200 according to the embodiment will be described. The computer 200 is communicably connected with the communication unit 12. There may be a plurality of computers 200. For convenience, only one computer 200 is shown in FIG. 2. The computer 200 is, for example, a PC or a server. The computer 200 may be of any kind so long as it can create printing data D1 and transmit printing data D1 to a multifunction peripheral 100. For example, the computer 200 may be a smartphone or a tablet terminal. The computer 200 includes a processing portion 201, a storage device 202, a display 203, an input device 204, and a network communication unit 205.

The processing portion 201 controls the operation of the computer 200. For example, the processing portion 201 is a circuit board including a CPU 201a. The processing portion 201 controls the operation of the computer 200 based on an OS, software 206, and data. The storage device 202 includes a ROM, a RAM, and an HDD. The storage device 202 stores the OS of the computer 200, programs, software 206, and data on a non-volatile basis. The processing portion 201 controls the different parts of the computer 200 based on what is stored in the storage device 202.

The processing portion 201 makes the display 203 display various kinds of information. The display 203 includes, for example, a liquid crystal display panel or an organic EL display panel. The input device 204 is a device for accepting user operation. The input device 204 is connected to the processing portion 201. The input device 204 is, for example, a keyboard or a mouse. A network communication unit 205 includes a communication circuit and a communication memory. The communication memory stores communication software. The network communication unit 205, in response to an instruction from the processing portion 201, communicates with the communication unit 12 of the multifunction peripheral 100. For printing, the network communication unit 205 transmits printing data D1 toward the communication unit 12 of the multifunction peripheral 100.

In the storage device 202 of the computer 200, software 206 is installed. For example, word-processing software, spreadsheet software, image data editing software, and browser software are installed. In the storage device 202 of the computer 200, also a printer driver 207 is installed. The printer driver 207 is software for performing printing in the multifunction peripheral 100.

When printing a document created with the software 206 or a document browsed, a user executes a print command in the software 206. The input device 204 accepts entry of the print command. When the print command is entered, the processing portion 201, based on the printer driver 207, generates printing data D1. The processing portion 201 makes the network communication unit 205 transmit generated printing data D1 toward the communication unit 12 of the multifunction peripheral 100. Printing data D1 received by the communication unit 12 is stored in the storage unit 2.

FIG. 2 shows one example of printing data D1. For example, printing data D1 includes PDL data 6 and setting data 6a. Based on the printer driver 207, the processing portion 201 generates PDL data 6 in which the content (printing content) of each page of the document is written in a page description language. The printer driver 207 includes software for converting page content (printing content) into data written in the page description language. The processing portion 201 includes in printing data D1 setting data 6a including setting values set by a user.

PDL data 6 includes characters (texts, words, sentences) to be printed. In PDL data 6, for each character, its position on a page, size, font, and kind of decoration are defined. The decoration here relates to the decoration of characters. The kinds of decoration definition include, for example, no decoration, decorated (in italics), and decorated (underlined).

<Flow of Processing of Printing Data D1>

Figure 3:
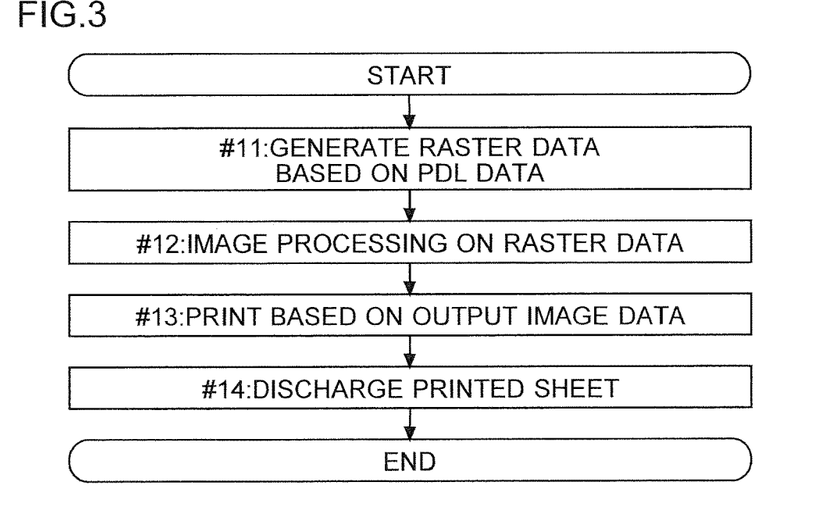
FIG. 3 is a diagram showing one example of the flow of printing data processing according to the embodiment.

Next, with reference to FIG. 3, one example of a basic flow of processing of printing data D1 according to the embodiment will be described. The procedure shown in FIG. 3 starts when printing data D1 received by the communication unit 12 is stored in the storage unit 2. Processing shown in FIG. 3 is performed for each page. For a printing job with a plurality of pages, processing shown in FIG. 3 is repeated a plurality of times.

First, the controller 1 generates raster data based on PDL data 6 (rasterization processing; step #11). For example, the image processing circuit 11 in the controller 1 generates raster data (bitmap data, image data). The image processing circuit 11 includes, for example, a raster data generation circuit. The controller 1 generates raster data for each page. When printing data D1 includes PDL data 6 corresponding to a plurality of pages, the controller 1 generates raster data for a plurality of pages. The resolution of raster data can be determined in advance. In the multifunction peripheral 100, the resolution is, for example, 600 dpi.

PDL data 6 is data in which the output image of printing is written in a page description language. When generating raster data, the controller 1 first analyzes the content written in PDL data 6. Written in PDL data 6 are the content of the characters, symbols, and diagrams to be printed, the positions of the characters, symbols, and diagrams to be printed, and the formats of the characters, symbols, and diagrams to be printed. For example, in the PDL data 6, imaging commands are added to the characters to be converted into image data. The controller 1 performs rasterization processing based on the analysis result (based on the description of PDL data 6).

Next, the controller 1 performs image processing on generated raster data (step #12). For example, the image processing circuit 11 performs image processing. The controller 1 refers to setting data 6a. Based on setting data 6a, the controller 1 recognizes image processing to be executed. For example, when a reduction rate is set in the printer driver 207, setting data 6a includes the reduction rate. The image processing circuit 11 performs reduction processing based on setting data 6a. Furthermore, the image processing circuit 11 generates output image data. Output image data is data obtained by converting the format of raster data to form a toner image in the image forming unit 53.

The controller 1, based on the output image data, makes the printing unit 5 print output image data (step #13). The image processing circuit 11 transmits output image data to the printing unit 5 line by line. The printing unit 5 generates a toner image line by line based on received output image data. The controller 1 makes the sheet feeding unit 51 and a sheet conveying unit 52 feed and convey a sheet in time for the transfer of the toner image. The controller 1 makes the fixing unit 54 fix the toner image. The controller 1 discharges the printed sheet onto a discharge tray (step #14). Printing of one page is thus completed (END).

<Font Cache Area 7>

Figure 4:
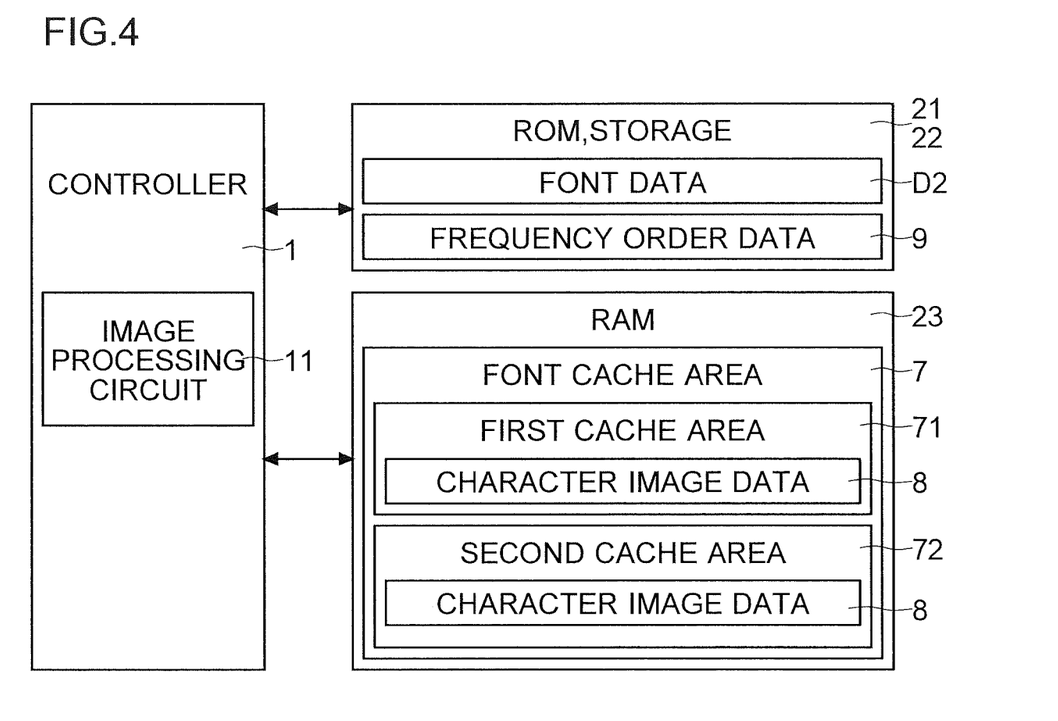
FIG. 4 is a diagram showing one example of a font cache area according to the embodiment.

With reference to FIG. 4, one example of a font cache area 7 according to the embodiment will be described. In the computer 200, software 206 for handling a file is installed. Some software 206 handles characters (texts). With software 206 for creating a document, it is possible to input characters using an input device 204.

Characters are symbols for writing down words in a language. A word is formed by one character alone or by combining a plurality of characters. In the case of English, characters comprise alphabet letters. In the case of Japanese, characters comprise, for example, hiragana, katakana, and kanji. The used characters differ depending on the language (national language). Characters in this description may include numerical figures. Characters in this description may include descriptive symbols (symbols in the narrow sense). Descriptive symbols are symbols used for document description. The descriptive symbols include, for example, parentheses, punctuations, period, comma, colon, semicolon, and the at mark. The descriptive symbols differ depending on the language.

A user arranges (combines) characters to input words and texts. When printing a file including characters, the user enters the file print command using the input device 204. When the print command is entered, the computer 200 (processing portion 201) generates PDL data 6 in which characters (types, symbol codes) included in the file, the position of each character, the size of each character (point), and the font of each character are described.

When generating raster data, the controller 1 (image processing circuit 11) prepares image data of each character (character image data 8) which is described to be imaged in PDL data 6. The controller 1 pastes prepared character image data 8 to a corresponding position in the raster data. For imaging of plurality of characters, the controller 1 repeats pasting of character image data 8.

The multifunction peripheral 100 has a function to cache character image data 8. When character image data 8 to be prepared is not cached, the controller 1 (image processing circuit 11) generates new character image data 8. When character image data 8 of a symbol to be prepared is reproducibly cached, the controller 1 pastes character image data 8 to raster data using cached data.

The multifunction peripheral 100 stores data (font data D2) for generating character image data 8. Either or both of the ROM 21 and the storage 22 store font data D2 on a non-volatile basis. Either or both of the ROM 21 and the storage 22 function as a first storage unit for storing font data D2. A plurality of kinds of font data D2 are stored.

The multifunction peripheral 100 supports a plurality of languages. For example, the multifunction peripheral 100 supports more than 100 languages. The multifunction peripheral 100 stores at least one kind of font data D2 for each language. For example, there are plurality of kinds of font names in Latin-alphabet languages. In the case of Japanese, there are plurality of fonts such as Gothic and Mincho types. In practice, the storage unit 2 stores a plurality of sets of font data D2 available for each language. The number of sets of font data D2 determines the number of available fonts.

The storage unit 2 may store the font data D2 of bitmap fonts. Also, the storage unit 2 may store the font data D2 of outline fonts. The image processing circuit 11, using font data D2, generates character image data 8. When the font data D2 of a bitmap font is used, the image processing circuit 11 generates character image data 8 by enlarging or reducing the bit map of the character to be imaged. When the font data D2 of an outline font is used, the image processing circuit 11 generates character image data 8 by converting vector data of the character to be imaged to a raster image.

The controller 1 makes the font cache area 7 reproducibly (reusably) store the generated character image data 8. In the multifunction peripheral 100, the font cache area 7 is provided in the RAM 23. A part of the storage area in the RAM 23 is allocated to the font cache area 7. That is, the RAM 23 functions as a second storage unit. The second storage unit includes the font cache area 7 for reproducing the character image data 8. The controller 1 controls the memory of the font cache area 7.

The size of one font cache area 7 is prescribed. The size of one font cache area 7 is, for example, about 16 KB. The controller 1 sets first and second cache areas 71 and 72 in one font cache area 7. The controller 1, for example, allots a half of the font cache area 7 to the first cache area 71. Also, the controller 1 allots the other half of the font cache area 7 to the second cache area 72. Character image data 8 is cached in each cache area. The controller 1 may reserve a plurality of font cache areas 7 in the RAM 23.

<Selection of Language>

Figure 5:
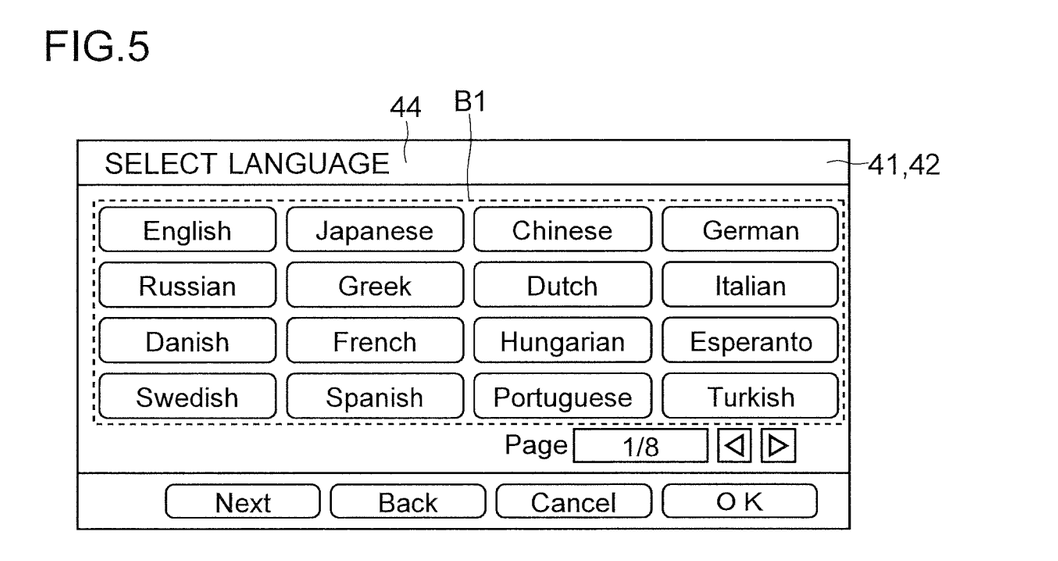
FIG. 5 is a diagram showing one example of a language selection screen according to the embodiment.

Next, with reference to FIG. 5, one example of language selection on the multifunction peripheral 100 according to the embodiment will be described. In the multifunction peripheral 100, it is possible to select a language to be used. A language used is a language used in printing. In other words, a language used is a language used in a print result based on PDL data 6. When predetermined operation is performed on the operation panel 4, the controller 1 displays a language selection screen 44 on the display panel 41. FIG. 5 shows one example of the language selection screen 44. The number of languages selectable on the multifunction peripheral 100 is as high as, for example, a hundred and several tens. The operation panel 4 accepts language selection. The multifunction peripheral 100 includes the operation panel 4 which accepts language selection.

In the language selection screen 44, a plurality of language selection buttons B1 are arranged. Each language selection button B1 is labeled with one language name. When the language selection button B1 for the language used is not shown on the language selection screen 44, a user switches the page of the language selection screen 44 to the next or the previous page. By operating (touching) the language selection button B1, it is possible to select the used language. For example, when English is to be selected, the language selection button B1 including the characters "English" is operated. The controller 1, based on the output from the operation panel 4, recognizes the selected language selection button B1. The controller 1 thus recognizes the selected language.

<Rasterization Processing Based on Frequency Order Data 9>

Figure 6:
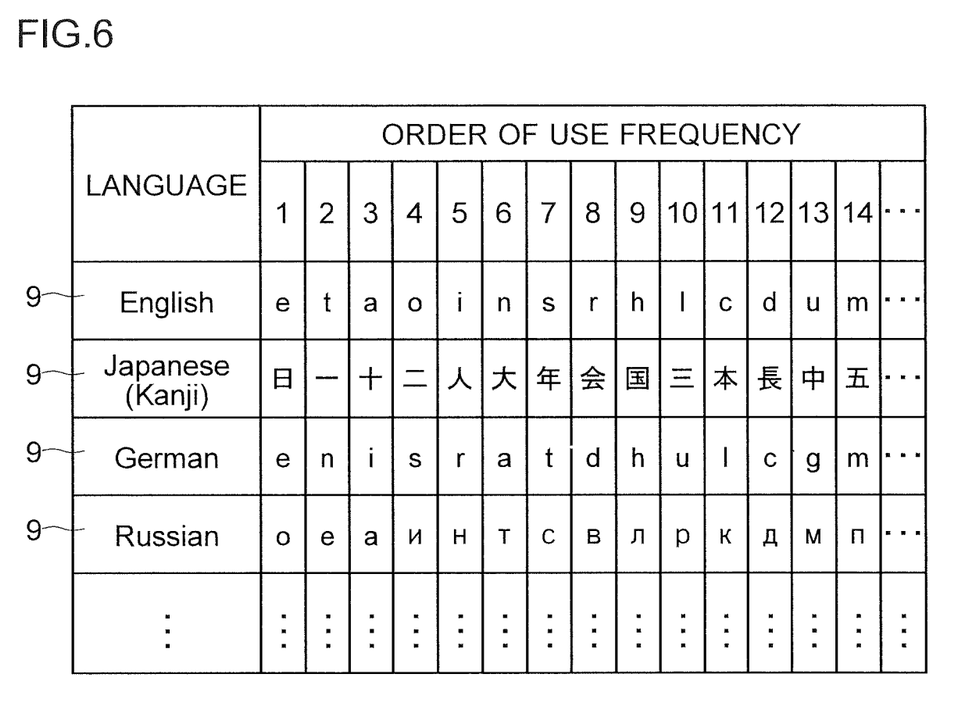
FIG. 6 is a diagram showing one example of frequency order data according to the embodiment.
Figure 7:
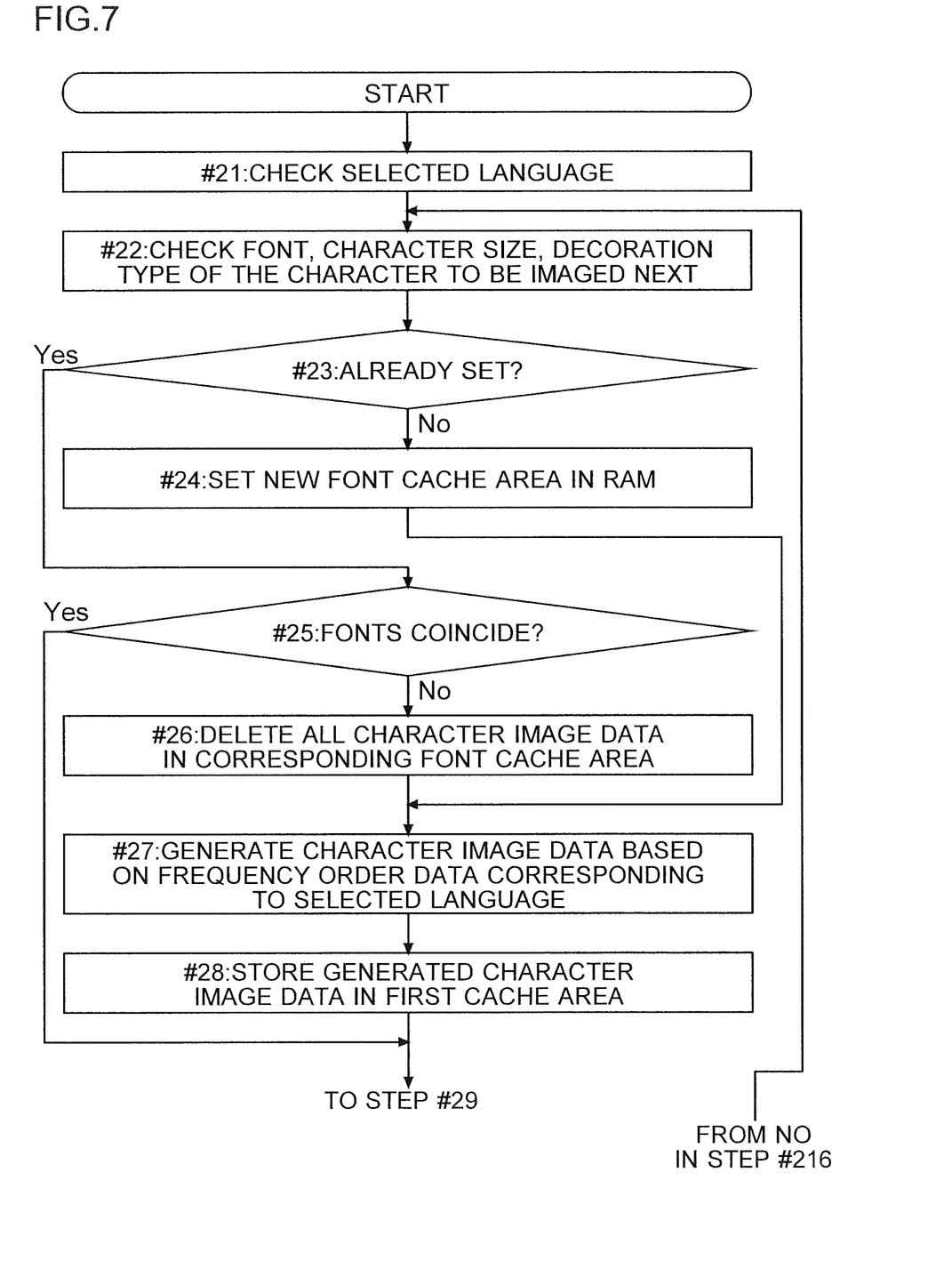
FIG. 7 is a diagram showing one example of processing based on frequency order data according to the embodiment.
Figure 8:
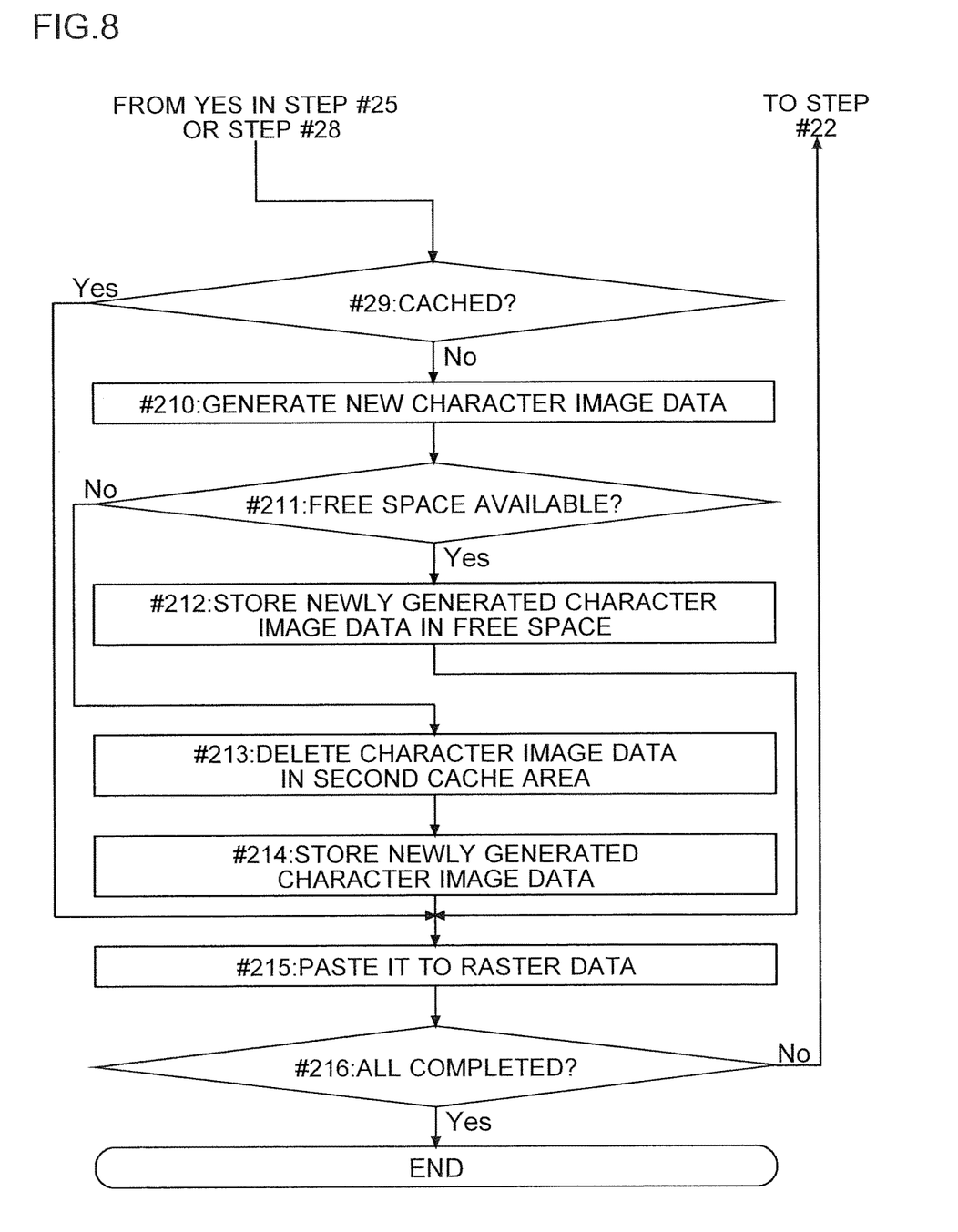
FIG. 8 is a diagram showing one example of processing based on frequency order data according to the embodiment.

With reference to FIGS. 6 to 8, one example of the flow of rasterization processing based on frequency order data 9 according to the embodiment will be described. First, either or both of the ROM 21 and the storage 22 store frequency order data 9 on a non-volatile basis (see FIG. 1). The frequency order data 9 is data in which characters are defined in descending order of use frequency for each selectable language. The frequency order data 9 is created based on the statistics of the use frequency of characters. In the field of linguistics, there are statistics of the use frequency of characters (letter frequency) for each language. Based on the linguistic statistics, the order of the use frequency of characters may be defined.

As shown in FIG. 6, frequency order data 9 is prepared for each language. For convenience, only one set of frequency order data 9 is shown in FIG. 1. One set of frequency order data 9 corresponds to one language. FIG. 6 shows one example of frequency order data 9 for some languages. For example, there are statistics that indicate that the most frequently used character in English is "e". Some studies show that 12 to 13% of the characters in a text is "e". Thus, in the frequency order data 9 for English, the alphabet letter e may be defined to be in the first place. In the example of frequency order data 9 for English shown in FIG. 6, the five most frequently used characters are, in descending order, e, t, a, o, and i. The places of the characters vary depending on the statistics referred to. Also for other languages such as Japanese, frequently used characters are defined.

Based on frequency order data 9, the controller 1 caches character image data 8 in the first cache area 71. Hereinafter, with reference to FIGS. 7 and 8, one example of the flow of caching character image data 8 using frequency order data 9 and of rasterization processing will be described. The flow charts in FIGS. 7 and 8 may be executed for one page of PDL data 6 at a time.

When PDL data 6 includes characters to be imaged, the controller 1 images one character after another included in PDL data 6. The controller 1 images lines including the characters to be imaged starting with the characters in the top line in a page. The controller 1 images the characters in a line left to right. When imaging of the character in a line is completed, the controller 1 starts imaging of the characters in the next line including characters to be imaged. When imaging is completed for all the characters to be imaged in a page, generation of raster data for one page is completed.

After generation of raster data for one page is completed, when any page to be rasterized is still left, the controller 1 continues to perform rasterization processing for the next page. Of the lines including characters to be imaged, the controller 1 images (performs rasterization processing of) the characters starting with the topmost line in the next page.

The procedure shown in FIG. 7 starts when rasterization processing is started based on PDL data 6 including characters to be imaged. First, the controller 1 checks the selected language (step #21). Next, the controller 1 checks the font, character size, and decoration type of the character to be imaged next (step #22). For example, immediately after rasterization processing is started, the controller 1 checks the font, character size, and decoration type of the first character on the first page.

In PDL data 6, the font of the character to be imaged is specified. For example, for European languages, there are fonts such as Century, Arial, Times, and New Roman. Also, for Japanese, there are fonts such as various Mincho types. The controller 1 checks the font (font name) of the first character.

In PDL data 6, the character size of the character to be imaged is specified. For example, the font size such as 10 points or 12 points is specified. For example, 1 point is 1/72 inches (approximately 0.35 mm). In PDL data 6, the decoration type of the character to be imaged is specified. For the decoration type, for example, no decoration, underlined, and italics can be specified.

The controller 1 checks whether the font cache area 7 corresponding to the character size and decoration type to be imaged has been set or not (step #23). For example, when the character to be imaged next is specified to have a character size of 12 points and a decoration type of no decoration, the controller 1 checks whether the font cache area 7 for a character of 12 points and no decoration is set or not.

When no corresponding font cache area 7 has been set (No in step #23), the controller 1 sets a new font cache area 7 in the RAM 23 (step #24). The newly set font cache area 7 is a font cache area 7 for a character corresponding to the character size and decoration type of the characters to be imaged (corresponding font cache area 7). The controller 1 sets a different font cache area 7 for each different combination (pattern) of decoration type and character size. When forming a new font cache area 7, the controller 1 includes the first cache area 71 and the second cache area 72 in the font cache area 7.

When a language with the upper and lower cases is selected, the controller 1 can set font cache areas 7 for the upper case and for the lower case at the same time in the RAM 23 (second storage unit). Such languages include, for example, English. That is, the controller 1 can add two font cache areas 7 at the same time. In this case, for each combination of decoration type and character size, two font cache areas 7 are set.

When Japanese is selected, the controller 1 may set font cache areas 7 for kanji, for hiragana, and for katakana at the same time in the RAM 23 (second storage unit). That is, the controller 1 can add three new font cache areas 7 at the same time. In this case, for each combination of decoration type and character size, three font cache areas 7 are set.

On the other hand, when a corresponding font cache area 7 has already been set (Yes in step #23), the controller 1 checks whether the font in the font cache area 7 corresponding to the character size and decoration type to be imaged corresponds to the font of the characters that are about to be imaged (step #25). The font may be changed in the middle of a text. For example, the font may be changed between headings and texts other than the headings. Or, for better document appearance, a plurality of fonts may be used in a document. The controller 1 checks the change of font. When the font is changed (No in step #25), the controller 1 deletes all character image data 8 in the corresponding font cache area 7 (step #26). The controller 1 deletes character image data 8 from both the first and second cache areas 71 and 72.

When a new font cache area 7 is set (step #24), or all character image data 8 is deleted (step #26), the controller 1 (image processing circuit 11) generates new character image data 8 based on frequency order data 9 corresponding to the selected language (step #27). The controller 1, based on frequency order data 9 corresponding to the selected language generates one or more sets of character image data 8 in descending order of character use frequency.

The controller 1 (image processing circuit 11), based on font data D2 corresponding to the font of the character to be imaged, generates character image data 8. The controller 1 generates character image data 8 of a specified character size. The controller 1 generates character image data 8 of a specified decoration type. For example, when the Arial font is specified, the controller 1 (image processing circuit 11), based on font data D2 of Arial, generates character image data 8. When the character size is 12 points, the controller 1 generates character image data 8 of 12 points. When the decoration type is italics, the controller 1 generates character image data 8 in italics.

The controller 1 has newly generated character image data 8 stored in the first cache area 71 in the corresponding font cache area 7 (step #28). When a new font cache area 7 is set, the controller 1 has generated character image data 8 stored in the newly set first cache area 71. When character image data 8 is deleted from the set font cache area 7, the controller 1 has generated character image data 8 stored in the first cache area 71 of the font cache area 7 which has undergone deleting.

The controller 1 determines the number of sets of generated character image data 8 for the first cache area 71 to which character image data 8 is stored. The controller 1 generates the determined number of sets of character image data 8. Specifically, the controller 1 checks the size of the (newly set) first cache area 71 in which character image data 8 is stored. Also, the controller 1 recognizes the data amount of character image data 8 corresponding to the character size defined in PDL data 6. For example, when generated raster data is of 600 dpi and contains characters of 12 points, the number of dots in the vertical and horizontal directions are 12/72×600=100 dots. Thus, the size of character image data 8 for one character is 100 dots×100 dots=10000 dots=approximately 1.25 KB. The controller 1 makes the image processing circuit 11 generate the same number of sets of character image data 8 as the largest integer among the integers smaller than the number obtained by dividing the size of the first cache area 71 by the data amount for one character in recognized character image data 8. For example, when the size of the first cache area 71 is 8 KB and the size of character image data 8 for one character is 1.25 KB, then 8/1.25=6.4. In this case, the controller 1 generates character image data 8 corresponding to six characters. That is, the controller 1 generates the maximum number of sets of character image data 8 cacheable in the first cache area 71.

For example, when the selected language is English and the number of sets to be generated is 6, the controller 1 generates character image data 8 of e, t, a, o, i, and n for the font cache area 7 for the lower case. Also, the controller 1 generates character image data 8 of E, T, A, O, I, and N for the font cache area 7 for the upper case.

When the selected language is Japanese and the number of sets to be generated is 6, the controller 1 makes the image processing circuit 11 generate character image data 8 of six kanji characters for the font cache area 7 for kanji. Also, the controller 1 makes the image processing circuit 11 generate character image data 8 of six hiragana characters for the font cache area 7 for hiragana. Also, the controller 1 makes the image processing circuit 11 generate character image data 8 of six katakana characters for the font cache area 7 for katakana.

When the fonts coincide with each other (Yes in step #25), or after step #28, the controller 1 checks whether character image data 8 corresponding to the character to be imaged is cached (stored) in the font cache area 7 (step #29). The controller 1 checks the first and second cache areas 71 and 72 in the font cache area 7 corresponding to the character size and decoration type.

When no corresponding character image data 8 is cached (when a cache failure occurs, or No in step #29), the controller 1 (image processing circuit 11) generates new character image data 8 of the characters which are not cached (characters to be imaged) based on font data D2 (step #210). The controller 1 generates character image data 8 of a character size and a decoration type specified for the character to be imaged.

The controller 1 checks whether there is a free space large enough to store newly generated character image data 8 in the second cache area 72 (step #211). The controller 1 checks the second cache areas 72 in the font cache area 7 corresponding to the character size and decoration type of the generated character image data 8. When there is a free space (Yes in step #211), the controller 1 has newly generated character image data 8 stored in the free space (step #212). The controller 1 has the character image data 8 in the second cache area 72 stored in the corresponding font cache area 7.

When there is no free space (No in step #211), the controller 1 deletes one of the sets of character image data 8 stored in the second cache area 72 in the corresponding font cache area 7 (step #213). The controller 1 deletes character image data 8 by an LRU method. The LRU method is a method of deleting character image data 8 with the longest unused time. The controller 1 has newly generated character image data 8 stored in the space freed by the deletion (step #214).

When corresponding character image data 8 is cached (when data hits, or Yes in step #29), after step #212 or step #214, the controller 1 (image processing circuit 11) pastes character image data 8 stored in the font cache area 7 to (embeds it in) raster data (step #215). When a cache failure occurs, the controller 1 deletes character image data 8 only from the second cache area 72. Even when a cache failure occurs, the controller 1 never deletes character image data 8 in the first cache area 71.

Next, the controller 1 checks whether all processing (rasterization processing) of the characters to be imaged has been completed or not (step #216). When it is completed (Yes in step #216), this flow is finished (END). When it is not completed (No in step #216), the flow returns to step #22.

Specific Example

Figure 9:
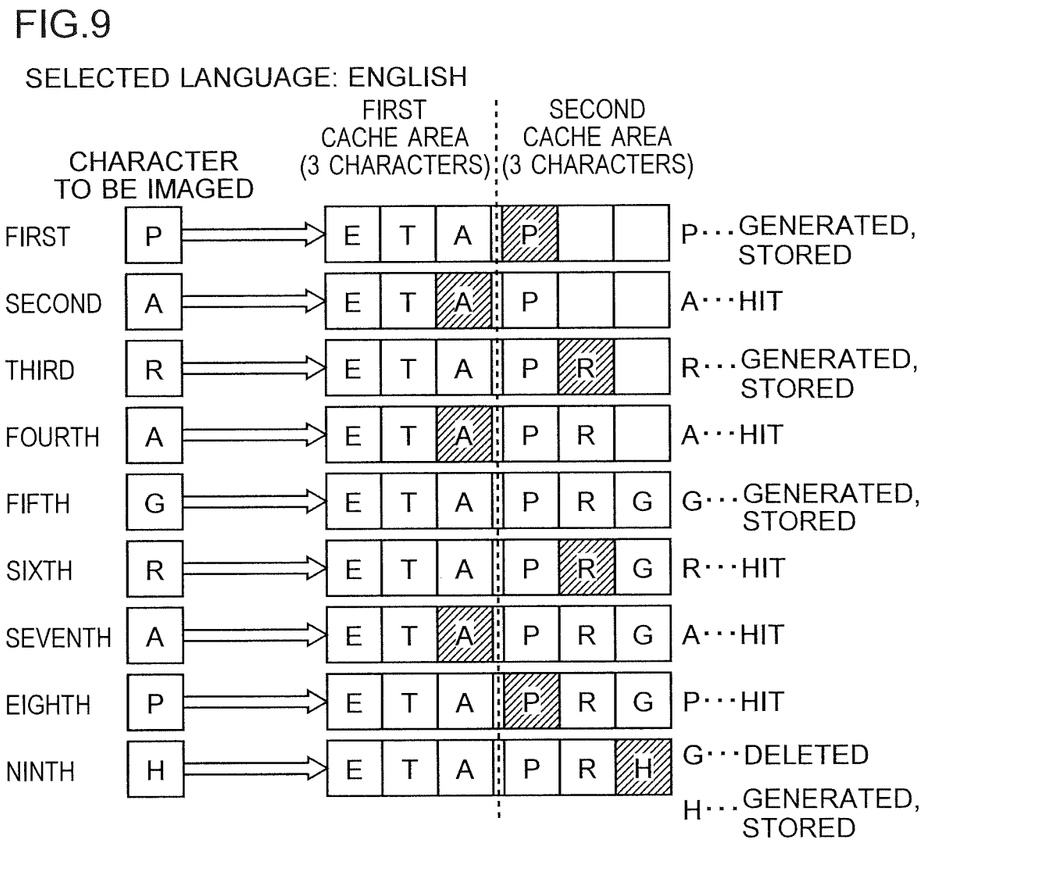
FIG. 9 is a diagram showing one specific example of a rasterization processing in the multifunction peripheral according to the embodiment.

Next, with reference to FIG. 9, one specific example of rasterization processing in the multifunction peripheral 100 according to the embodiment will be described. FIG. 9 shows an example of imaging the characters "PARAGRAPH". The command written in PDL data 6 is, for example, "!R!TEXT"PARAGRAPH";EXIT;". This is merely an example, and how imaging of characters is written in PDL data 6 varies depending on the kind of page description language. FIG. 9 deals with an example in which the selected language is English. FIG. 9 deals with an example in which the number of sets (the number of characters) of character image data 8 cacheable in each of the first and second cache areas 71 and 72 is three.

As shown in FIG. 9, the controller 1 has the character image data 8 of E, T, and A stored in the first cache area 71. In frequency order data 9, "E" is the character in the first place in the frequency of use in English. T and A are in the second and third places respectively. Character image data 8 in the first cache area 71 is fixed.

The first character to be imaged is P. Character image data 8 of P is not in the font cache area 7. The controller 1 thus generates character image data 8 of P. The controller 1 has generated character image data 8 of P stored in the second cache area 72. The second character to be imaged is A. Character image data 8 of A is cached in the first cache area 71 (it hits). It is not necessary to generate character image data 8 of A.

The third character to be imaged is R. Character image data 8 of R is not in the font cache area 7. The controller 1 thus generates character image data 8 of R. The controller 1 has generated character image data of R stored in the second cache area 72. The fourth character to be imaged is A. Character image data 8 of A is cached in the first cache area 71 (it hits). It is not necessary to generate character image data 8 of A. The fifth character to be imaged is G. Character image data 8 of G is not in the font cache area 7. The controller 1 thus generates character image data 8 of G. The controller 1 has generated character image data 8 of G stored in the second cache area 72.

The sixth character to be imaged is R. Character image data 8 of R is cached in the second cache area 72 (it hits). It is not necessary to generate character image data 8 of R. The seventh character to be imaged is A. Character image data 8 of A is cached in the first cache area 71 (it hits). It is not necessary to generate character image data 8 of A. The eighth character to be imaged is P. Character image data 8 of P is cached in the second cache area 72 (it hits). It is not necessary to generate character image data 8 of P.

The ninth character to be imaged is H. Character image data 8 of H is not in the font cache area 7. Here, the second cache area 72 is full. The controller 1 thus deletes character image data 8 of G of which the unused time is the longest in character image data 8 in the second cache area 72. The controller 1 thus generates character image data 8 of H. The controller 1 has the generated character image data 8 of H stored in the second cache area 72.

<Change of Language>

Next, with reference to FIG. 10, one example of changing the language on the multifunction peripheral 100 according to the embodiment will be described. For example, in the multifunction peripheral 100, the controller 1 has the set font cache area 7 retained in the RAM 23 until the power is turned off (shut down). The stored content in the RAM 23 is deleted when the power is turned off. For example, when rasterization processing is started, the controller 1 makes the image processing circuit 11 use character image data 8 which has been stored in the font cache area 7 during the previous rasterization processing.

In the first cache area 71, character image data 8 of frequently used characters in the selected language is cached. Character image data 8 in the first cache area 71 is retained, and thus whichever language is selected, the hit rate is generally maintained at a high level. Here, the operation panel 4 accepts selection of the language to be used. The operation panel 4 may accept change of the used language. Frequently used characters differ depending on the language. For example, frequently used characters (alphabets) differ among English, German, and Russian. When the language is changed, it is preferable to discard the content in the first cache area 71.

Figure 10:
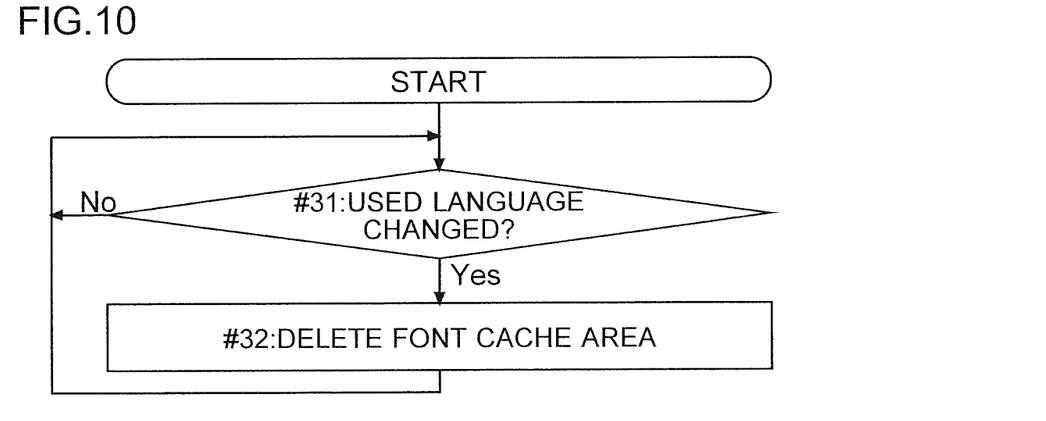
FIG. 10 is a diagram showing one example of processing during change of the language in the multifunction peripheral according to the embodiment.

START in FIG. 10 is the time point when the power to the multifunction peripheral 100 is turned on and the controller 1, the storage unit 2, and the operation panel 4 start up. The controller 1 continues to check whether the used language is changed (step #31, No in step #31 and then step #31). The controller 1, based on the output from the operation panel 4, recognizes whether the used language has been changed or not. When the used language is changed, the controller 1 deletes the set font cache area 7 (step #32). The controller 1 empties the font cache area 7. Cache can be thus cleared automatically in accordance with the change of the language. The procedure then returns to step #31.

As described above, the image processing apparatus (multifunction peripheral 100) according to the embodiment includes the accepting unit (operation panel 4), the first storage unit (ROM 21, storage 22), the second storage unit (RAM 23), and the controller 1. The accepting unit accepts selection of a used language. The first storage unit stores font data D2. The first storage unit stores frequency order data 9 in which, for each language, characters are defined in descending order of use frequency. The second storage unit includes the font cache area 7. The second storage unit stores character image data 8 in the font cache area 7. The controller 1, using character image data 8 stored in the font cache area 7, based on PDL data 6 written in the page description language, performs rasterization processing in which characters are imaged one by one to generate raster data. The controller 1 sets, as the font cache area 7, the first and second cache areas 71 and 72 in the second storage unit. The controller 1, based on frequency order data 9 corresponding to the selected language, generates character image data 8 in descending order of character use frequency. The controller 1 has the character image data 8 generated based on frequency order data 9 stored in the first cache area 71. When a cache failure occurs in which character image data 8 to be imaged is not cached in the font cache area 7, the controller 1, based on font data D2, newly generates character image data 8 of the character that is not cached. The controller 1 has the newly generated character image data 8 stored in the second cache area 72.

It is possible to cache in the first cache area 71 character image data 8 of frequently used characters in the selected language. It is possible to cache in the first cache area 71 character image data 8 of characters which are linguistically and statistically likely to be used. Whichever language is selected, the average hit rate of cache can be increased. Regardless of the type of the used language, rasterization processing can be performed faster than ever before. It thus helps reduce the time required for rasterization processing compared to ever before.

The controller 1 recognizes the data amount per character in character image data 8 to be stored in the first cache area 71. The controller 1 stores in the first cache area 71 the same number of sets of character image data 8 as the largest integer among the integers smaller than the number obtained by dividing the size of the first cache area 71 by the recognized data amount. It is possible to store as much character image data 8 as possible in the first cache area 71. The hit rate of cache can be increased. Regardless of the type of used language, rasterization processing can be performed faster than before. The processing performance of the image processing apparatus can be improved compared to ever before.

When a cache failure occurs, the controller 1 does not delete character image data 8 in the first cache area 71. It is possible not to delete character image data 8 stored in the first cache area 71. In the LRU method, image data of characters which are likely to be used may be discarded. However, it is possible to retain character image data 8 of characters which are statistically likely to be used.

When a cache failure occurs, the controller 1 checks whether there is free space large enough to store newly generated character image data 8 in the second cache area 72. When there is free space, the controller 1 has the newly generated character image data 8 stored in the free space. When there is no free space, the controller 1 deletes character image data 8 with the longest unused time in the character image data 8 stored in the second cache area 72. The controller 1 has the newly generated character image data 8 stored in the space freed by the deletion. In the second cache area 72, character image data 8 is cached by the LRU method. It is possible to cache character image data 8 so that the hit rate is higher.

When the accepting unit accepts the change of the used language, the controller 1 deletes the entire set font cache area 7. The controller 1 sets a new font cache area 7 according to PDL data 6 to which rasterization processing is performed. In accordance with the change of the language, the font cache can be cleared. In accordance with rasterization processing to be performed, it is possible to set a new font cache area 7. In the first cache area 71 of the newly set font cache area 7, character image data 8 based on frequency order data 9 is stored. Accordingly, even when the used language is changed, it is possible to maintain the hit rate at a high level.

The controller 1 sets the font cache area 7 for each character size of the character to be imaged. The controller 1, based on frequency order data 9 corresponding to the selected language, generates character image data 8 in descending order of character use frequency. The controller 1 has the generated character image data 8 stored in the corresponding first cache area 71. It is possible to set the first and second cache areas 71 and 72 for each size of the character to be imaged. The cache area is prepared for each character size, and thus the hit rate can improved. Rasterization processing can be performed at a high speed.

The controller 1 sets the first and second cache areas 71 and 72 for each decoration type of the character to be imaged. The controller 1, based on frequency order data 9 corresponding to the selected language, generates character image data 8 including decoration in descending order of character use frequency. The controller 1 has the generated character image data 8 stored in the corresponding first cache area 71. With this configuration, the first and second cache areas 71 and 72 can be set according to the decoration type of the character to be imaged. A plurality of font cache areas 7 are set according to the decoration type, and thus the hit rate can be improved. Rasterization processing can be performed at a high speed.

More specifically, the controller 1 recognizes the character size and decoration of the character to be imaged. The controller 1, when there is no font cache area 7 corresponding to the combination of the recognized character size and decoration, newly sets a font cache area 7 corresponding to the combination. Based on frequency order data 9 corresponding to the selected language, the controller 1 generates character image data 8 corresponding to the recognized combination in descending order of use frequency. The controller 1 has the generated character image data 8 stored in the newly set first cache area 71. The font cache area 7 can be set based on the combination of character size and decoration. In accordance with the number of combinations of character size and decoration, the size of the area to be used for font cache can be changed.

The controller 1, when the font of the character to be imaged and the font of the character that has been imaged immediately before are different, deletes character image data 8 in the first and second cache areas 71 and 72. The controller 1, based on frequency order data 9 and font data D2 corresponding to the selected language, generates character image data 8 using the font of the character to be imaged in descending order of character use frequency. The controller 1 has the character image data 8 generated based on frequency order data 9 stored in the first cache area 71 which has undergone deleting. In accordance with a switch of the used font, the first and second cache areas 71 and 72 can be reset. It is possible to have the character image data 8 of the font after the switch stored in the first and second cache areas 71 and 72.

The embodiment described above is in no way meant to limit the present disclosure, which thus allows for many modifications and variations within the spirit of the present disclosure.

What is claimed is:

1. An image processing apparatus, comprising:
an accepting unit which accepts selection of a used language;
a first storage unit which stores font data and frequency order data in which characters are defined in descending order of use frequency for each language;
a second storage unit which includes a font cache area and which stores character image data in the font cache area; and
a controller,
wherein
the controller
performs rasterization processing in which, using the character image data stored in the font cache area, based on PDL data written in a page description language, characters are imaged one by one to generate raster data,
sets first and second cache areas in the second storage unit as the font cache area,
generates the character image data in descending order of character use frequency based on the frequency order data corresponding to the selected language,
stores the character image data generated based on the frequency order data in the first cache area,
newly generates the character image data of the character which is not cached based on the font data when a cache failure occurs in which the character image data to be imaged is not cached in the font cache area, and
stores the newly generated character image data in the second cache area.

2. The image processing apparatus according to claim 1, wherein
the controller
recognizes a data amount per character in the character image data to be stored in the first cache area, and
stores in the first cache area a same number of sets of the character image data as a largest integer among integers smaller than a number obtained by dividing a size of the first cache area by the recognized data amount.

3. The image processing apparatus according to claim 1, wherein
when the cache failure occurs,
the controller does not delete the character image data in the first cache area.

4. The image processing apparatus according to claim 1, wherein
when the cache failure occurs,
the controller
checks whether there is free space large enough to store the newly generated character image data in the second cache area,
stores the newly generated character image data in the free space when there is free space,
deletes the character image data with a longest unused time in the character image data stored in the second cache when there is no free space, and
stores the newly generated character image data in the free space freed by deletion.

5. The image processing apparatus according to claim 1, wherein,
when the accepting unit accepts selection of the used language,
the controller
deletes all the set font cache area, and
sets the new font cache area according to the PDL data based on which the rasterization processing is performed.

6. The image processing apparatus according to claim 1, wherein
the controller
sets the font cache area for each character size of a character to be imaged,
generates the character image data of the character size in descending order of character use frequency based on frequency order data corresponding to the selected language, and
stores the generated character image data in the corresponding first cache area.

7. The image processing apparatus according to claim 1, wherein
the controller
sets the first and second cache areas for each decoration type of a character to be imaged,
generates the character image data including decoration in descending order of character use frequency based on frequency order data corresponding to the selected language, and
stores the generated character image data in the corresponding first cache area.

8. The image processing apparatus according to claim 1, wherein
the controller
recognizes character size and decoration of a character to be imaged,
newly sets the font cache area corresponding to a combination of the recognized character size and decoration when there is no font cache area corresponding to the combination,
generates the character image data of the character size in descending order of character use frequency based on the frequency order data corresponding to the selected language, and
has the generated character image data stored in the newly set first cache area.

9. The image processing apparatus according to claim 1, wherein
the controller
deletes the character image data in the first and second cache areas when a font of a character to be imaged and a font of a character that has been imaged immediately before are different, generates the character image data using the font of the character to be imaged in descending order of character use frequency based on the frequency order data and the font data corresponding to the selected language, and has the character image data generated based on the frequency order data stored in the first cache area which has undergone deleting.

10. A method for controlling an image processing apparatus comprising:

accepting selection of used language, storing in a first storage unit font data and frequency order data in which, for each language, characters are defined in descending order of use frequency, having a font cache area for storing character image data stored in a second storage unit, performing, using the character image data stored in the font cache area, based on PDL data written in a page description language, rasterization processing in which characters are imaged one by one to generate raster data, setting first and second cache areas in the second storage unit as the font cache area, generating the character image data in descending order of character use frequency based on frequency order data corresponding to the selected language, storing the character image data generated based on the frequency order data in the first cache area, newly generating the character image data of the character which is not cached based on the font data when a cache failure occurs in which the character image data to be imaged is not cached in the font cache area, and storing the newly generated character image data in the second cache area.

* * * * *